(12) United States Patent  
Glatfelter et al.

(10) Patent No.: US 9,185,083 B1
(45) Date of Patent: Nov. 10, 2015

(54) CONCEALING DATA WITHIN ENCODED AUDIO SIGNALS

(71) Applicant: The Boeing Company, Chicago, IL (US)

(72) Inventors: John William Glatfelter, West Chester, PA (US); Christopher William Raab, Mullica Hill, NJ (US)

(73) Assignee: THE BOEING COMPANY, Chicago, IL (US)

( * ) Notice: Subject to any disclaimer, the term of this patent is extended or adjusted under 35 U.S.C. 154(b) by 139 days.

(21) Appl. No.: 13/900,780

(22) Filed: May 23, 2013

(51) Int. Cl.
*H04K 1/00* (2006.01)
*H04L 29/06* (2006.01)

(52) U.S. Cl.
CPC .................. *H04L 63/0428* (2013.01)

(58) Field of Classification Search
CPC .............................. H04L 9/00; H04L 63/0428

USPC ......................................................... 380/255
See application file for complete search history.

(56) References Cited

U.S. PATENT DOCUMENTS

| 6,330,335 | B1 | 12/2001 | Rhoads |
| 6,675,146 | B2 | 1/2004 | Rhoads |
| 7,117,149 | B1 * | 10/2006 | Zakarauskas ................. 704/233 |
| 8,290,202 | B2 | 10/2012 | Carr et al. |
| 8,391,543 | B1 | 3/2013 | Verma |
| 2003/0191626 | A1 * | 10/2003 | Al-Onaizan et al. .............. 704/8 |
| 2012/0109632 | A1 * | 5/2012 | Sugiura et al. .................... 704/3 |

* cited by examiner

*Primary Examiner* — Peter Shaw
(74) *Attorney, Agent, or Firm* — Yee & Associates, P.C.

(57) ABSTRACT

A method and apparatus for concealing data to be transmitted within an environment. A sound frequency map is identified based on sounds detected within the environment. A number of audio symbols for use in representing a number of data blocks in the data to be transmitted within the environment are selected using the sound frequency map. An encrypted audio signal is formed using the number of audio symbols.

21 Claims, 5 Drawing Sheets

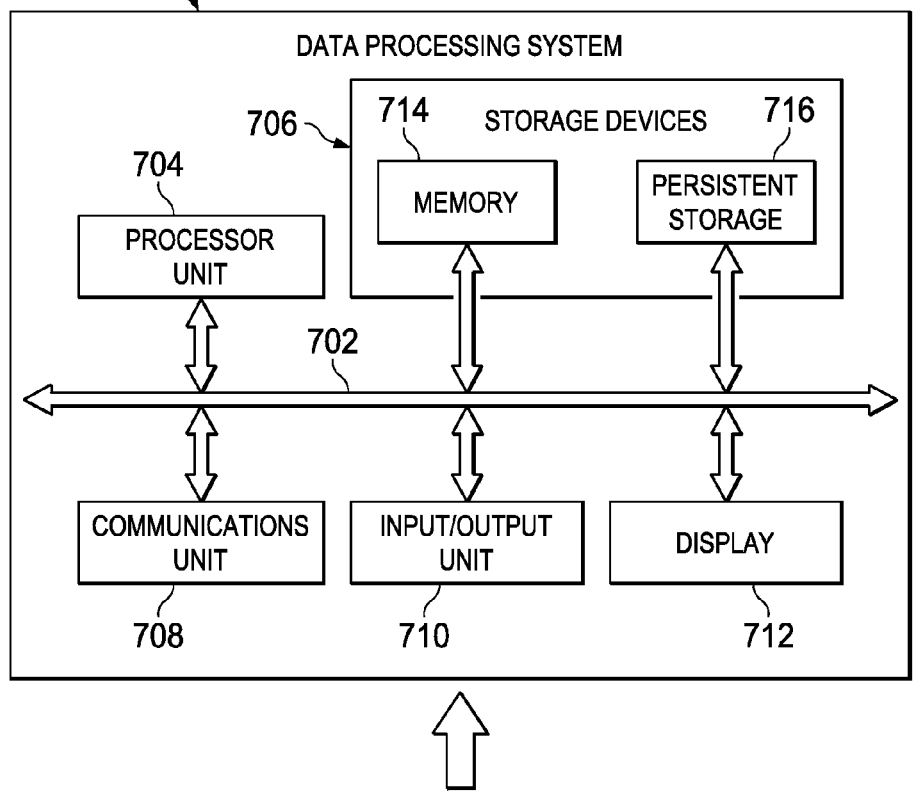
FIG. 7
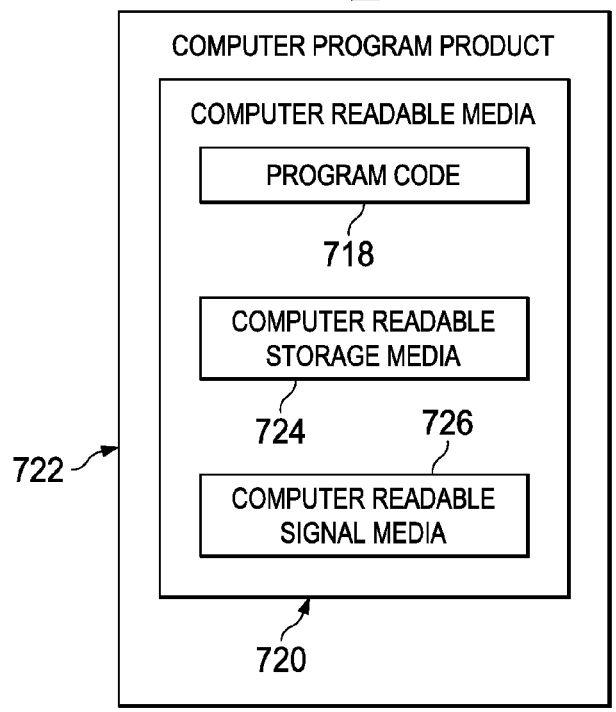

CONCEALING DATA WITHIN ENCODED AUDIO SIGNALS

BACKGROUND INFORMATION

1. Field

The present disclosure relates generally to transmitting and receiving sound, and in particular, to transmitting encrypted data within sound. Still more particularly, the present disclosure relates to a method and apparatus for concealing data within sound using sounds characteristic of the environment.

2. Background

Currently, different types of encryption algorithms are present for encrypting data and providing secure communications. However, with some currently available encryption methods, certain risks may still be present. For example, some encryption methods use encryption keys that are shared between the transmitter and the receiver of encrypted messages. These types of encryption keys may be easily obtained, directly or indirectly, by an unauthorized person. An unauthorized person may, for example, use guesswork, brute-force search techniques, dictionary program-based methods, and/or other types of methods to obtain an encryption key.

Further, in some cases, the transmission of data, whether encrypted or not encrypted, may be vulnerable to certain threats through the very awareness of the existence of the transmission. As a result, concealing the communications channels used to transmit data may be beneficial. However, some currently available methods for concealing communications channels may be less effective than desired.

As the need for and importance of secure communications increase, the complexities and costs associated with encryption algorithms also increase. The complexities and costs associated with some currently available encryption methods may be greater than desired. Therefore, it would be desirable to have a method and apparatus that take into account at least some of the issues discussed above, as well as other possible issues.

SUMMARY

In one illustrative embodiment, a method for concealing data to be transmitted within an environment is provided. A sound frequency map is identified based on sounds detected within the environment. A number of audio symbols for use in representing a number of data blocks in the data to be transmitted within the environment are selected using the sound frequency map. An encrypted audio signal is formed using the number of audio symbols.

In another illustrative embodiment, an apparatus comprises a sound manager and an encoder. The sound manager is configured to identify a sound frequency map based on sounds detected within an environment. The encoder is configured to select a number of audio symbols for use in representing a number of data blocks in data to be transmitted within the environment using the sound frequency map. The encoder is further configured to form an encrypted audio signal using the number of audio symbols.

In yet another illustrative embodiment, an apparatus comprises a sound detector and a decoder. The sound detector is configured to receive sound that is transmitted within an environment and convert the sounds into an encrypted audio signal. The decoder is configured to identify a number of audio symbols in the encrypted audio signal. The decoder is further configured to identify a number of data blocks represented by the number of audio signals using decoding information comprising at least one of a data frequency map, a sound frequency map, and a frequency mapping key.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a data processing system in the form of a block diagram in accordance with an illustrative embodiment.

DETAILED DESCRIPTION

The illustrative embodiments recognize and take into account different considerations. For example, the illustrative embodiments recognize and take into account that it may be desirable to have a cost-effective method for encrypting data using sound. Further, the illustrative embodiments recognize and take into account that it may be desirable to have a method for concealing the transmission of encrypted data in a manner such that unauthorized persons may be unaware of the existence of the transmission.

Thus, the illustrative embodiments provide a method and apparatus for concealing the transmission of data. In one illustrative embodiment, a method for concealing data to be transmitted within an environment is provided. A sound frequency map is identified based on sounds detected within the environment. A number of audio symbols for use in representing a number of data blocks in the data to be transmitted within the environment are selected using the sound frequency map. An encrypted audio signal is formed using the number of audio symbols.

Figure 1:
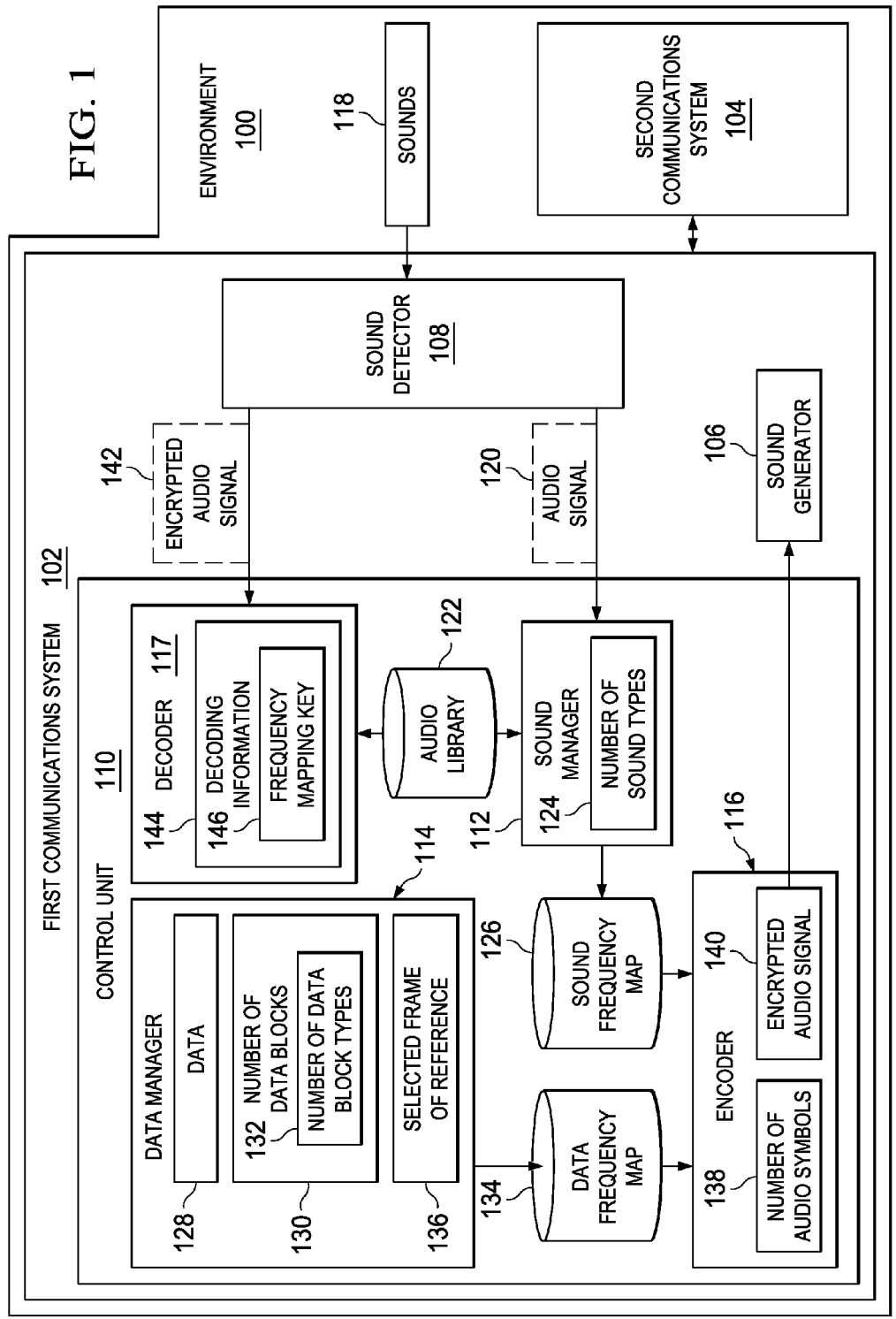
FIG. 1 is an illustration of an environment in which secure communications may be provided in the form of a block diagram in accordance with an illustrative embodiment in accordance with an illustrative embodiment.

Referring now to the figures and, in particular, with reference to FIG. 1, an illustration of an environment in which secure communications may be provided is depicted in the form of a block diagram in accordance with an illustrative embodiment. In this illustrative example, environment 100 is an example of one environment in which secure communications may be provided. In particular, secure communications may be provided between first communications system 102 and second communications system 104, both located within environment 100.

In this illustrative example, first communications system 102 and second communications system 104 may be implemented in a number of different ways. Depending on the implementation, first communications system 102 and second communications system 104 may be configured to communicate over any number of communications links. These communications links may be wireless communications links. However, in some cases, these communications links may include wireless communications links, wired communications links, optical communications links, and/or other types of communications links.

Further, first communications system 102 and second communications system 104 may be configured to communicate using sound. First communications system 102 and second communications system 104 may be implemented in a similar manner. In one illustrative example, first communications system 102 may include sound generator 106 and sound detector 108.

Sound generator 106 may be implemented in a number of different ways. For example, sound generator 106 may include any number of electroacoustic transducers, other types of sensors, and/or other types of sound generating devices. An electroacoustic transducer may also be referred to as a speaker or a loudspeaker, depending on the implementation. Second communications system 104 may include a sound generator implemented in a manner similar to sound generator 106.

Further, sound detector 108 may be implemented in a number of different ways. For example, sound detector 108 may include any number of acoustic-to-electric transducers, other types of sensors, and/or other types of listening devices. An acoustic-to-electric transducer may also be referred to as a microphone, depending on the implementation. Second communications system 104 may include a sound detector implemented in a manner similar to sound detector 108.

First communications system 102 may also include control unit 110. Second communications system 104 may include a control unit implemented in a similar manner to control unit 110. Control unit 110 may be implemented using hardware, software, or a combination of the two. In one illustrative example, control unit 110 may be implemented in a computer system. The computer system may be comprised of one or more computers, depending on the implementation. When more than one computer is present in the computer system, these computers may be in communication with each other.

Control unit 110 is configured to use the sounds inherent to, or characteristic of, environment 100 to provide secure communications between first communications system 102 and second communications system 104. As depicted, control unit 110 includes sound manager 112, data manager 114, encoder 116, and decoder 117. Each of sound manager 112, data manager 114, encoder 116, and decoder 117 may be implemented using hardware, software, or a combination of the two.

Sound manager 112 is configured to control both sound generator 106 and sound detector 108. Sound manager 112 uses sound detector 108 to detect sounds 118 that occur within environment 100. Sound detector 108 is configured to detect sounds 118 and convert sounds 118 into audio signal 120 that is sent to sound manager 112.

Sound manager 112 processes audio signal 120. In this illustrative example, sound manager 112 uses audio library 122 to identify number of sound types 124. As used herein, a "number of" items may include one or more items. In this manner, number of sound types 124 may be one or more sound types.

Audio library 122 may be, for example, a collection of audio symbols. As used herein, an "audio symbol" may be an electrical representation or some other type of representation of a particular sound. Audio library 122 may be a collection of audio symbols that represent known, or previously identified, sounds. In some cases, the different audio symbols stored within audio library 122 may be organized according to the type of environment. For example, audio library 122 may store one group of audio symbols for a desert environment, another group of audio symbols for a jungle environment, and another group of audio symbols for an urban environment.

Sound manager 112 uses audio library 122 to identify the different audio symbols within audio signal 120 and then identify number of sound types 124 for sounds 118 detected within environment 100. Sounds 118 may include the types of sounds that are considered ambient sounds within environment 100. For example, when environment 100 takes the form of a jungle, sounds 118 detected within environment 100 may include at least one of an insect chirping, a bird chirping, an animal sound, leaves blowing, a twig breaking, or some other type of sound.

As used herein, the phrase "at least one of,", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this manner, sound manager 112 uses audio library 122 to analyze audio signal 120 and identify number of sound types 124. Sound manager 112 then uses number of sound types 124 identified to generate sound frequency map 126. Sound frequency map 126 identifies a frequency with which each of number of sound types 124 occurs within environment 100. Each of number of sound types 124 may be represented by a corresponding audio symbol within sound frequency map 126.

Depending on the implementation, sound manager 112 may use sound detector 108 to continuously monitor sounds 118 that occur within environment 100 or to detect sounds 118 that occur within environment 100 over a selected period of time. When sounds 118 are detected over a selected period of time, sound frequency map 126 may be created for that selected period of time. A new sound frequency map may be created for some later period of time.

When sounds 118 are detected by sound detector 108 continuously, sound frequency map 126 may be modified to reflect changes in the frequencies of occurrence of any sound types in number of sound types 124 within environment 100 over time. In these cases, sound frequency map 126 may be considered a dynamic sound frequency map. In this illustrative example, sound frequency map 126 is generated for use in encoding data that is to be transmitted from first communications system 102 to second communications system 104 in sound.

For example, data manager 114 in first communications system 102 may be configured to receive data 128 to be transmitted to second communications system 104. Data 128 may include at least one of text data, numeric data, binary data, image data, raster data, sensor data, radar data, acoustic data, encrypted data, and/or other types of data.

Further, data 128 may be comprised of number of data blocks 130. As used herein, a "data block" may be a particular entity of data within data 128. A data block may take the form of, for example, without limitation, a single character, a string of characters, a symbol, a phrase, a word, a sentence, an expression, a binary sequence, an image, a row of pixels in an image, a column of pixels in an image, a single pixel, a pixel having a particular pixel value, a portion of an audio file, or some other type of data block.

Data manager 114 is configured to identify number of data block types 132 of number of data blocks 130 in data 128. For example, two or more data blocks in data 128 may be of the same type. As one illustrative example, data 128 may comprise plain text and the word "aircraft," which may be considered a data block type, may appear multiple times within the plain text. Each instance of the word "aircraft" may then be considered a particular data block.

Once number of data block types 132 has been identified, data manager 114 identifies data frequency map 134. Data frequency map 134 identifies a frequency of occurrence of each of number of data block types 132 with respect to selected frame of reference 136. Selected frame of reference 136 may be selected from one of, for example, without limitation, a particular language, a particular dialect, a particular technical field, a type of communications, a particular industry, or some other type of frame of reference.

The frequencies of occurrence for different types of data block types may be different for different frames of reference. As one illustrative example, the frequency of occurrence of the word "aircraft" when selected frame of reference 136 is aerospace technologies may be different from when selected frame of reference 136 is medical applications.

In this illustrative example, encoder 116 is configured to use both sound frequency map 126 and data frequency map 134 to encode data 128 in sound. In particular, encoder 116 uses sound frequency map 126 and data frequency map 134 to conceal, or cloak, data 128 within number of audio symbols 138. The process used to conceal data 128 within number of audio symbols 138 may be one method of steganography.

In particular, encoder 116 may align data frequency map 134 with sound frequency map 126 such that the frequencies identified in each of the maps are aligned. More specifically, data frequency map 134 and sound frequency map 126 may be aligned such that a data block type having a particular frequency of occurrence with respect to selected frame of reference 136 in data frequency map 134 may be matched to a corresponding sound type having a same or similar frequency within selected tolerances in sound frequency map 126. The audio symbol corresponding to this sound type may then be used to represent all instances of the data block type within data 128.

In this manner, encoder 116 may compile number of audio symbols 138 to represent number of data blocks 130 in data 128. Number of audio symbols 138 may form encrypted audio signal 140 that is to be transmitted. Encoder 116 may then send encrypted audio signal 140 to sound generator 106. Sound generator 106 may transmit encrypted audio signal 140 within the environment in the form of sound.

In this manner, encrypted audio signal 140 is formed in a manner such that the sound generated by sound generator 106 is characteristic of environment 100. In particular, the sound generated by sound generator 106 may resemble sounds 118 detected within environment 100. In other words, the sound generated by sound generator 106 may blend in with the ambient sounds of environment 100. As a result, unauthorized listeners and/or listening devices may be unable to readily or easily recognize the sound as carrying encrypted data.

Sound detector 108 in first communications system 102 may also be configured to receive sound, transmitted by second communications system 104, which is carrying data that has been encrypted. Sound detector 108 may be configured to convert this sound into encrypted audio signal 142 and send encrypted audio signal 142 to decoder 117. Decoder 117 may be configured to use decoding information 144 to decode encrypted audio signal 142 and retrieve the data that was encrypted within the audio signal.

Decoding information 144 may include at least one of data frequency map 134, sound frequency map 126, and frequency mapping key 146. In this illustrative example, frequency mapping key 146 may be a key that is shared between first communications system 102 and second communications system 104. Frequency mapping key 146 may be a key that allows both first communications system 102 and second communications system 104 to know which data block types were matched to which sound types.

In some cases, frequency mapping key 146 may be shared between first communications system 102 and second communications system 104 in the form of an encrypted audio signal. In other examples, frequency mapping key 146 may be shared between first communications system 102 and second communications system 104 in the form of a digital signal over a wireless communications link, a radio frequency communications link, an optical communications link, or some other type of communications link.

Decoder 117 identifies a number of audio symbols in encrypted audio signal 142 and uses decoding information 144 to match each of the audio symbols to a corresponding data block. In this manner, decoder 117 may reconstruct the number of data blocks in the data that was encrypted within encrypted audio signal 142 to form decrypted data. Decoder 117 may send this decrypted data to, for example, a display device or another computer system.

The illustrations of environment 100, first communications system 102, and second communications system 104 in FIG. 1 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
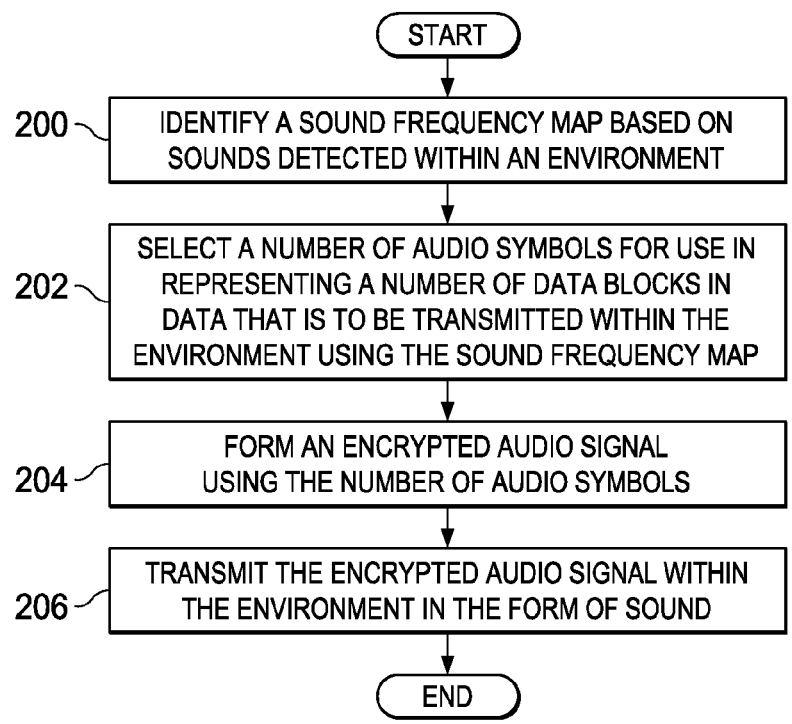
FIG. 2 is an illustration of a process for concealing data within sound in the form of a flowchart in accordance with an illustrative embodiment.

With reference now to FIG. 2, an illustration of a process for concealing data within sound is depicted in the form of a flowchart in accordance with an illustrative embodiment. The process illustrated in FIG. 2 may be implemented by a communications system such as, for example, first communications system 102 in FIG. 1.

The process begins by identifying a sound frequency map based on sounds detected within an environment (operation 200). Next, a number of audio symbols for use in representing a number of data blocks in data that is to be transmitted within the environment are selected using the sound frequency map (operation 202).

Thereafter, an encrypted audio signal is formed using the number of audio symbols (operation 204). The encrypted audio signal may then be transmitted within the environment in the form of sound (operation 206), with the process terminating thereafter.

The number of audio symbols described in operation 202 may be selected such that the likelihood of an unauthorized listener and/or listening device becoming aware of the existence of the transmission of encrypted data within the sound transmitted in operation 206 is reduced. In other words, the number of audio symbols may be selected such that the sound transmitted in operation 206 conceals the existence of data being carried within the sound.

Figure 3:
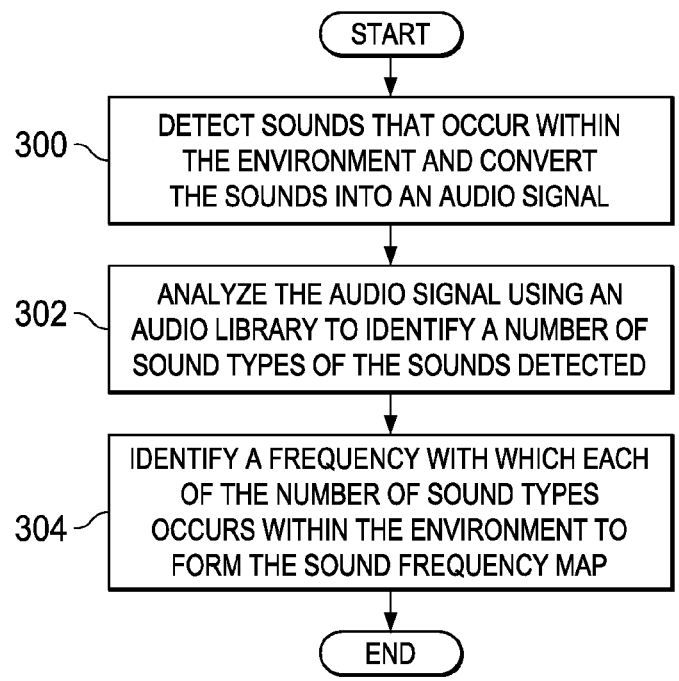
FIG. 3 is an illustration of a process for identifying a sound frequency map in the form of a flowchart in accordance with an illustrative embodiment.

With reference now to FIG. 3, an illustration of a process for identifying a sound frequency map is depicted in the form of a flowchart in accordance with an illustrative embodiment. The process illustrated in FIG. 3 may be implemented using control unit 110 in FIG. 1. Further, this process may be used to implement operation 200 in FIG. 2.

The process begins by detecting sounds that occur within the environment and converting the sounds into an audio signal (operation 300). Next, the audio signal is analyzed using an audio library to identify a number of sound types of the sounds detected (operation 302). A frequency with which each of the number of sound types occurs within the environment is identified to form the sound frequency map (operation 304), with the process terminating thereafter. In operation 304, each of the number of sound types in the sound frequency map may be represented by a corresponding audio symbol. In some cases, the sound frequency map may be modified as a frequency with which a sound type occurs within the environment changes over time.

Figure 4:
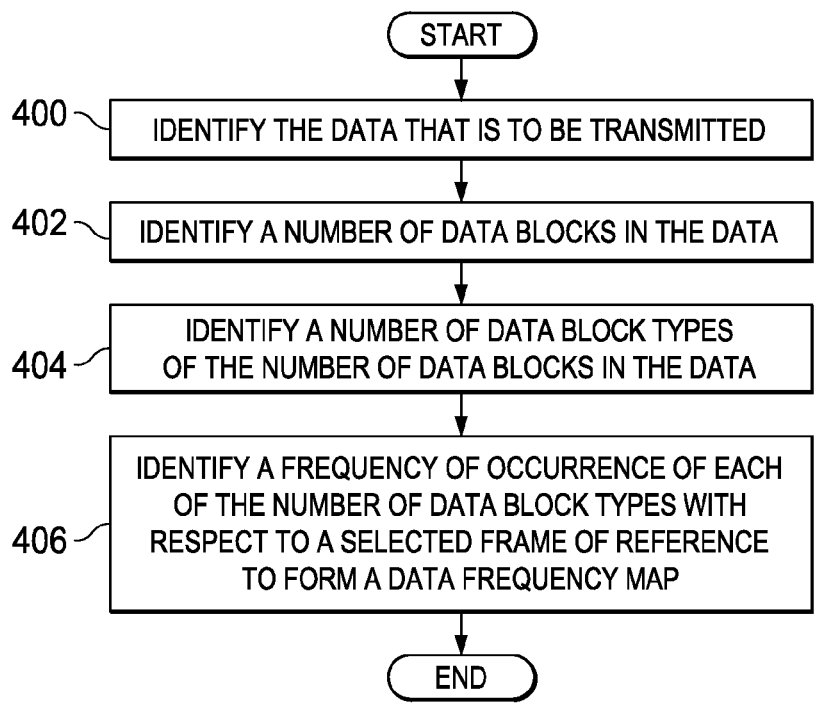
FIG. 4 is an illustration of a process for identifying a data frequency map in the form of a flowchart in accordance with an illustrative embodiment.

With reference now to FIG. 4, an illustration of a process for identifying a data frequency map is depicted in the form of a flowchart in accordance with an illustrative embodiment. The process illustrated in FIG. 4 may be implemented using, for example, control unit 110 in FIG. 1. In particular, the process may be implemented using data manager 114 in FIG. 1.

The process begins by identifying the data that is to be transmitted (operation 400). Next, a number of data blocks in the data are identified (operation 402). A number of data block types of the number of data blocks in the data are then identified (operation 404).

Thereafter, a frequency of occurrence of each of the number of data block types is identified with respect to a selected frame of reference to form a data frequency map (operation 406), with the process terminating thereafter.

Figure 5:
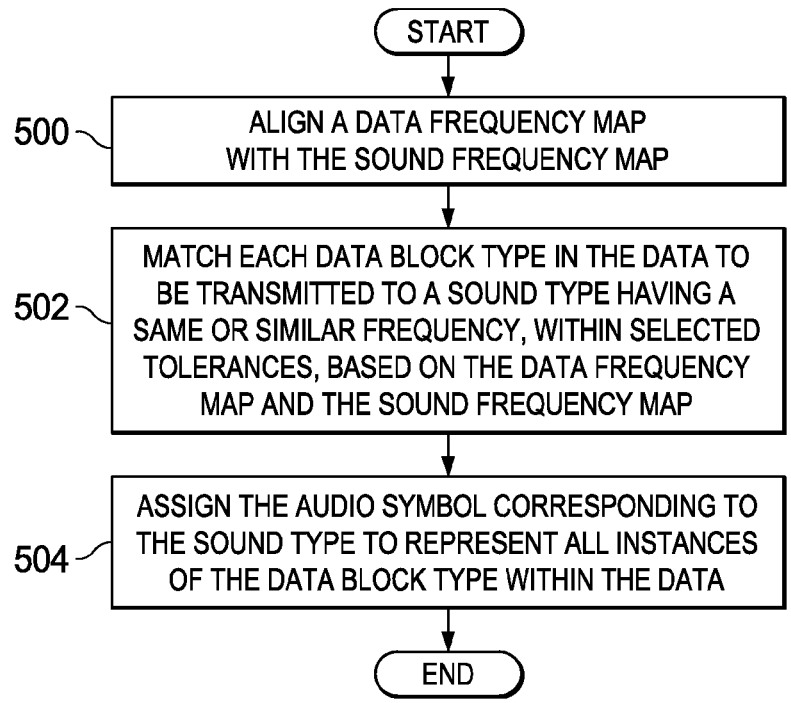
FIG. 5 is an illustration of a process for selecting a number of audio symbols for representing a number of data blocks in the form of a flowchart in accordance with an illustrative embodiment.

With reference now to FIG. 5, an illustration of a process for selecting a number of audio symbols for representing a number of data blocks is depicted in the form of a flowchart in accordance with an illustrative embodiment. The process illustrated in FIG. 5 may be implemented using, for example, control unit 110 in FIG. 1. Further, this process may be used to implement operation 202 in FIG. 2.

The process begins by aligning a data frequency map with the sound frequency map (operation 500). In operation 500, the data frequency map used may be the data frequency map formed using the process described in FIG. 4. Next, each data block type in the data to be transmitted is matched to a corresponding sound type having a same or similar frequency, within selected tolerances, based on the data frequency map and the sound frequency map (operation 502). The audio symbol corresponding to the sound type is then assigned to represent all instances of the data block type within the data (operation 504), with the process terminating thereafter.

Figure 6:
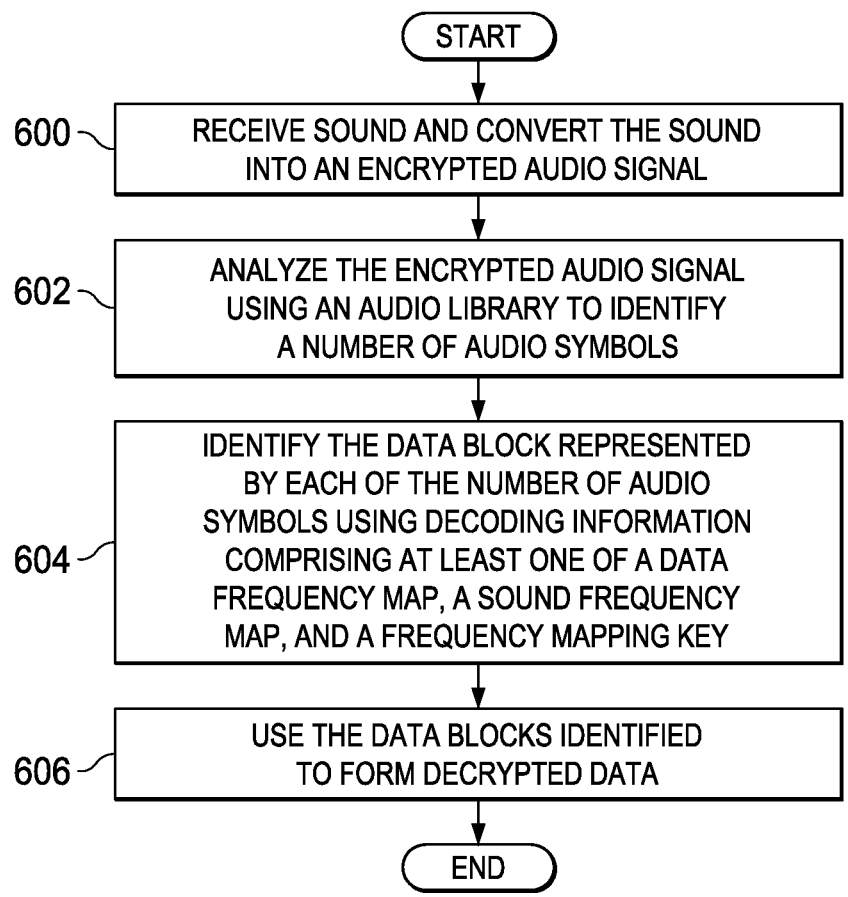
FIG. 6 is an illustration of a process for receiving and decoding an encrypted audio signal in the form of a flowchart in accordance with an illustrative embodiment.

With reference now to FIG. 6, an illustration of a process for receiving and decoding an encrypted audio signal is depicted in the form of a flowchart in accordance with an illustrative embodiment. The process illustrated in FIG. 6 may be implemented using control unit 110 in FIG. 1.

The process begins by receiving sound and converting the sound into an encrypted audio signal (operation 600). The encrypted audio signal is analyzed using an audio library to identify a number of audio symbols (operation 602). The data block represented by each of the number of audio symbols is identified using decoding information comprising at least one of a data frequency map, a sound frequency map, and a frequency mapping key (operation 604). The data blocks identified are used to form decrypted data (operation 606), with the process terminating thereafter.

Turning now to FIG. 7, an illustration of a data processing system in the form of a block diagram is depicted in accordance with an illustrative embodiment. Data processing system 700 may be used to implement control unit 110, sound manager 112, data manager 114, encoder 116, and/or decoder 117 in FIG. 1. As depicted, data processing system 700 includes communications framework 702, which provides communications between processor unit 704, storage devices 706, communications unit 708, input/output unit 710, and display 712. In some cases, communications framework 702 may be implemented as a bus system.

Processor unit 704 is configured to execute instructions for software to perform a number of operations. Processor unit 704 may comprise a number of processors, a multi-processor core, and/or some other type of processor, depending on the implementation. In some cases, processor unit 704 may take the form of a hardware unit, such as a circuit system, an application specific integrated circuit (ASIC), a programmable logic device, or some other suitable type of hardware unit.

Instructions for the operating system, applications, and/or programs run by processor unit 704 may be located in storage devices 706. Storage devices 706 may be in communication with processor unit 704 through communications framework 702. As used herein, a storage device, also referred to as a computer readable storage device, is any piece of hardware capable of storing information on a temporary and/or permanent basis. This information may include, but is not limited to, data, program code, and/or other information.

Memory 714 and persistent storage 716 are examples of storage devices 706. Memory 714 may take the form of, for example, a random access memory or some type of volatile or non-volatile storage device. Persistent storage 716 may comprise any number of components or devices. For example, persistent storage 716 may comprise a hard drive, a flash memory, a rewritable optical disk, a rewritable magnetic tape, or some combination of the above. The media used by persistent storage 716 may or may not be removable.

Communications unit 708 allows data processing system 700 to communicate with other data processing systems and/or devices. Communications unit 708 may provide communications using physical and/or wireless communications links.

Input/output unit 710 allows input to be received from and output to be sent to other devices connected to data processing system 700. For example, input/output unit 710 may allow user input to be received through a keyboard, a mouse, and/or some other type of input device. As another example, input/output unit 710 may allow output to be sent to a printer connected to data processing system 700.

Display 712 is configured to display information to a user. Display 712 may comprise, for example, without limitation, a monitor, a touch screen, a laser display, a holographic display, a virtual display device, and/or some other type of display device.

In this illustrative example, the processes of the different illustrative embodiments may be performed by processor unit 704 using computer-implemented instructions. These instructions may be referred to as program code, computer usable program code, or computer readable program code and may be read and executed by one or more processors in processor unit 704.

In these examples, program code 718 is located in a functional form on computer readable media 720, which is selectively removable, and may be loaded onto or transferred to data processing system 700 for execution by processor unit 704. Program code 718 and computer readable media 720 together form computer program product 722. In this illustrative example, computer readable media 720 may be computer readable storage media 724 or computer readable signal media 726.

Computer readable storage media 724 is a physical or tangible storage device used to store program code 718 rather than a medium that propagates or transmits program code 718. Computer readable storage media 724 may be, for example, without limitation, an optical or magnetic disk or a persistent storage device that is connected to data processing system 700.

Alternatively, program code 718 may be transferred to data processing system 700 using computer readable signal media 726. Computer readable signal media 726 may be, for example, a propagated data signal containing program code 718. This data signal may be an electromagnetic signal, an optical signal, and/or some other type of signal that can be transmitted over physical and/or wireless communications links.

The illustration of data processing system 700 in FIG. 7 is not meant to provide architectural limitations to the manner in which the illustrative embodiments may be implemented. The different illustrative embodiments may be implemented in a data processing system that includes components in addition to or in place of those illustrated for data processing system 700. Further, components shown in FIG. 7 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for concealing data to be transmitted within an environment, the method comprising:
   detecting, by a computer, sounds that occur within the environment;
   identifying, by the computer, a sound frequency map based on sounds detected within the environment, wherein identifying the sound frequency map based on the sounds detected within the environment comprises:
      converting, by the computer, the sounds into a number of audio signals;
      identifying, by the computer, a number of sound types based on the number of audio signals and a number of audio symbols stored in an audio library; and
      identifying, by the computer, a sound type frequency for which each of the number of sound types occurs within the environment over a selected period of time to form a sound frequency map;
   segmenting, by the computer, the data to be transmitted within the environment into a number of data blocks;
   identifying, by the computer, a number of data block types from the number of data blocks;
   identifying, by the computer, a data frequency map that identifies a data block frequency for occurrences of each of the number of data block types;
   correlating, by the computer, the data frequency map with the sound frequency map based on a same or similar data block frequency and sound type frequency within selected tolerances to form a frequency mapping key, such that each data block type in the number of data block types corresponds to a corresponding sound type of the number of sound types based on the data frequency map and the sound frequency map;
   assigning, by the computer, an audio symbol corresponding to the corresponding sound type to the data block type to represent each instance of the data block type in the data to be transmitted; and
   transforming, by the computer, the data to be transmitted into an encrypted audio signal using corresponding ones of the number of audio symbols to conceal the number of data blocks.

2. The method of claim 1 further comprising:
   transmitting the encrypted audio signal within the environment in a form of sound.

3. The method of claim 1 further comprising:
   identifying a data frequency map that identifies a frequency of occurrence of each of the number of data block types with respect to a selected frame of reference.

4. The method of claim 3, wherein identifying the data frequency map comprises:
   identifying the selected frame of reference for the data as one of a particular language, a particular dialect, a particular technical field, a particular industry, and a type of communications.

5. The method of claim 1 further comprising:
   modifying the sound frequency map over time, to reflect changes to the frequency of sound types occurring within the environment.

6. The method of claim 1 further comprising:
   identifying the data to be transmitted within the encrypted audio signal, wherein the data comprises at least one of text data, numeric data, binary data, image data, raster data, sensor data, radar data, acoustic data, and encrypted data.

7. The method of claim 1 further comprising:
transmitting the encrypted audio signal from a first communications system;
receiving the encrypted audio signal at a second communications system; and
decoding the encrypted audio signal using decoding information to form decrypted data, wherein the decoding information comprises at least one of a data frequency map, the sound frequency map, and the frequency mapping key.

8. An apparatus comprising:
a sound detector configured to detect the sounds that occur within the environment and convert the sounds into a number of audio signals;
a sound manager configured: to identify a sound frequency map based on the sounds detected within an environment, wherein: identifying the sound frequency map based on the sounds detected within the environment comprises: identifying a number of sound types based on the number of audio signals and a number of audio symbols stored in an audio library; and identifying a sound type frequency for which each of the number of sound types occurs within the environment over a selected period of time to form a sound frequency map;
a data manager configured: to segment the data to be transmitted within the environment into a number of data blocks; to identify a number of data block types from the number of data blocks; and to identify a data frequency map that identifies a frequency of occurrence of each of a number of data block types of the number of data blocks in the data with respect to a selected frame of reference;
an encoder configured: to correlate the data frequency map with the sound frequency map based on a same or similar data block frequency and sound type frequency within selected tolerances to form a frequency mapping key, such that each data block type in the number of data block types corresponds to a corresponding sound type of the number of sound types based on the data frequency map and the sound frequency map; to assign an audio symbol corresponding to the corresponding sound type to the data block type to represent each instance of the data block type in the data to be transmitted; and to transform the data to be transmitted into an encrypted audio signal using corresponding ones of the number of audio symbols to conceal the number of data blocks.

9. The apparatus of claim 8 further comprising:
a sound generator configured to transmit the encrypted audio signal within the environment as sound.

10. An apparatus comprising:
a sound detector configured to receive sound that is transmitted within an environment and convert the sound into an encrypted audio signal; and
a decoder configured to identify a number of audio symbols in the encrypted audio signal and identify a number of data blocks represented by the number of audio symbols using decoding information comprising at least one of a data frequency map, a sound frequency map, and a frequency mapping key; wherein:
the sound frequency map is formed by identifying a sound type frequency for which each of the number of sound types occurs within the environment over a selected period of time; identifying, by the computer; the data frequency map is formed by identifying a data block frequency for occurrences of each of the number of data block types with respect to a selected frame of reference; and the frequency mapping key is formed by correlating the data frequency map with the sound frequency map based on a same or similar data block frequency and sound type frequency within selected tolerances, such that each data block type in the number of data block types corresponds to a corresponding sound type of the number of sound types based on the data frequency map and the sound frequency map.

11. The apparatus of claim 10, wherein the sound frequency map identifies a frequency with which a number of sound types occur within the environment.

12. The method of claim 1, wherein transforming the data to be transmitted into the encrypted audio signal using corresponding ones of the number of audio symbols to conceal the number of data blocks further comprises:
encoding the encrypted audio signal using at least one of a data frequency map, the sound frequency map, and the frequency mapping key.

13. The apparatus of claim 8, wherein the selected frame of reference for the data is identified as one of a particular language, a particular dialect, a particular technical field, a particular industry, and a type of communications.

14. The apparatus of claim 8, wherein the sound frequency map is modified over time, to reflect changes to the frequency of sound types occurring within the environment.

15. The apparatus of claim 8, wherein the encoder is further configured:
to identify the data to be transmitted within the encrypted audio signal, wherein the data comprises at least one of text data, numeric data, binary data, image data, raster data, sensor data, radar data, acoustic data, and encrypted data.

16. The apparatus of claim 8, wherein transforming the data to be transmitted into the encrypted audio signal using corresponding ones of the number of audio symbols to conceal the number of data blocks further comprises:
encoding the encrypted audio signal using at least one of a data frequency map, the sound frequency map, and the frequency mapping key.

17. The apparatus of claim 10 further comprising:
a sound generator configured to transmit the encrypted audio signal within the environment as sound.

18. The apparatus of claim 10, wherein the selected frame of reference for the data is identified as one of a particular language, a particular dialect, a particular technical field, a particular industry, and a type of communications.

19. The apparatus of claim 10, wherein the sound frequency map is modified over time, to reflect changes to the frequency of sound types occurring within the environment.

20. The apparatus of claim 10, wherein the decoder is further configured:
to identify data transmitted within the encrypted audio signal, wherein the data comprises at least one of text data, numeric data, binary data, image data, raster data, sensor data, radar data, acoustic data, and encrypted data.

21. The apparatus of claim 10, wherein the decoder is further configured:
to decode data transmitted within the encrypted audio signal using at least one of a data frequency map, the sound frequency map, and the frequency mapping key.

* * * * *